United States Patent [19]

Leitzel

[11] 4,252,385
[45] Feb. 24, 1981

[54] SEALED WHEEL AND AXLE ASSEMBLIES

[75] Inventor: Ammon M. Leitzel, Portland, Oreg.

[73] Assignee: Jarman Company, Milwaukie, Oreg.

[21] Appl. No.: 36,054

[22] Filed: May 4, 1979

[51] Int. Cl.³ .............................................. F16C 33/72
[52] U.S. Cl. ................................. 308/36.1; 308/135
[58] Field of Search ..................... 308/36.1, 187, 161, 308/163, 135; 277/95, 96.1

[56] References Cited
U.S. PATENT DOCUMENTS

| | | | |
|---|---|---|---|
| 3,881,789 | 5/1975 | Kornylak | 308/36.1 |
| 4,022,480 | 5/1977 | Salter | 277/95 |
| 4,073,540 | 2/1978 | Jackowski | 308/36.1 |

Primary Examiner—Lenard A. Footland
Attorney, Agent, or Firm—Klarquist, Sparkman, Campbell, Leigh, Hall & Whinston

[57] ABSTRACT

The specification discloses wheel and axle assemblies in each of which a sealing washer serves both as a bearing seal and a thrust washer. The washer has a thicker, belled thrust washer portion and an outer, thinner, belled flange hinged to the thrust washer portion by a thin hinge portion. The flange acts as a wiper or seal on the hub of a golf cart wheel and the thrust washer portion sealingly engages an axle mounting the wheel.

11 Claims, 6 Drawing Figures

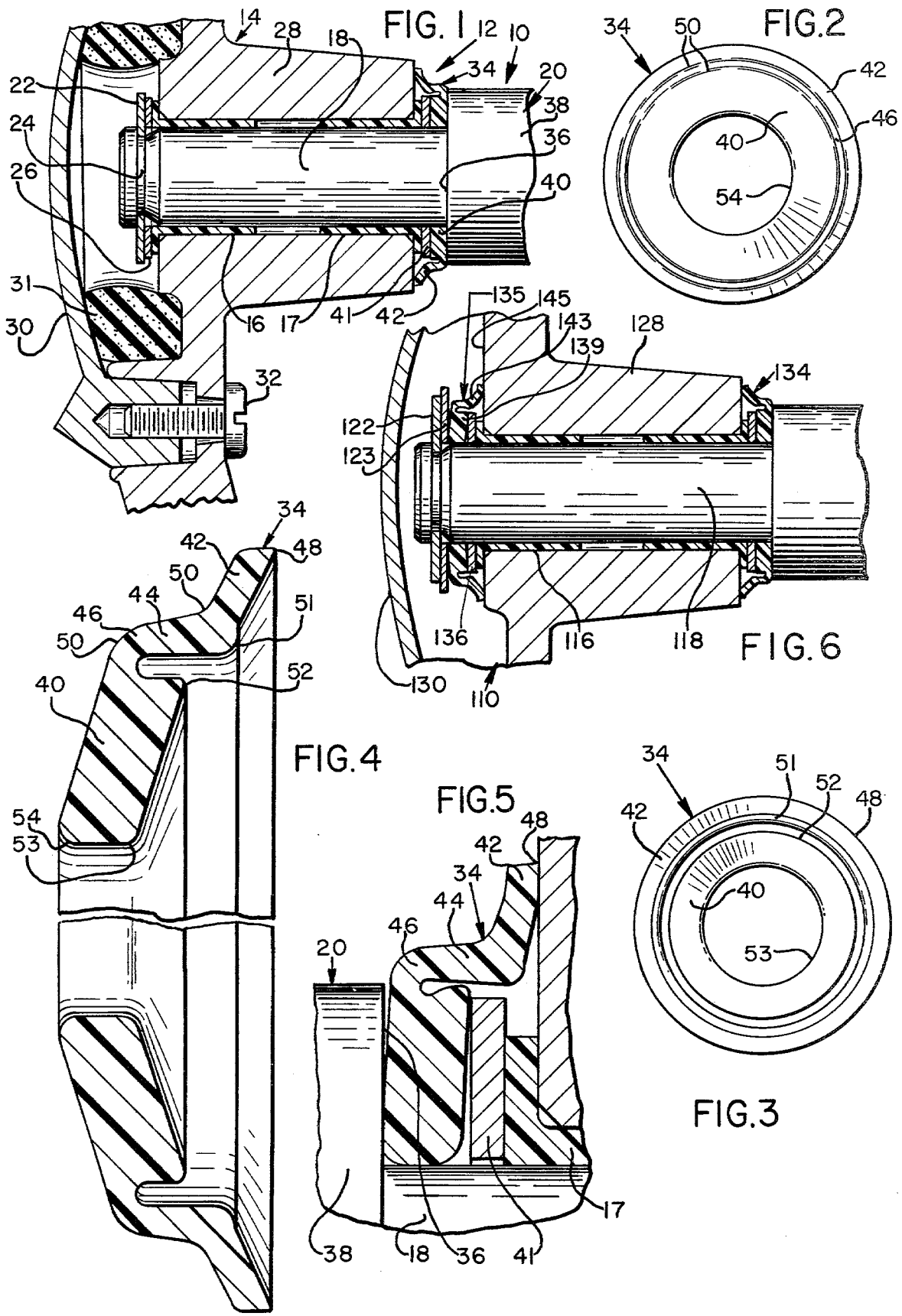

SEALED WHEEL AND AXLE ASSEMBLIES

BACKGROUND OF THE INVENTION

There has existed a need for a simple, effective construction for sealing a golf cart wheel bearing and an axle mounting the wheel and also for serving as a thrust bearing to take up any play between the wheel and a frame supported by the axle. U.S. Pat. No. 4,113,327 shows a combined seal and thrust washer but in a specialized roller construction. U.S. Pat. Nos. 3,881,789 and 4,113,328 disclose a seal but it is not adapted to take thrust.

OBJECTS OF THE INVENTION

One object of the invention is to provide improved sealed wheel and axle assemblies.

Another object of the invention is to provide a sealing washer serving to seal a wheel and an axle and also take up thrust between the wheel and a frame carried by the axle.

A further object of the invention is to provide a sealing washer having a thick, cupped spring washer portion and a thin, cupped sealing flange hinged to the washer portion.

SUMMARY OF THE INVENTION

The invention provides a sealing washer of elastomeric material having an inner washer portion adapted to sealingly engage an axle and belled to act in thrust against a thrust retainer on the axle and a hub portion of the wheel, the washer also including an outer cupped flange portion for sealingly engaging an end face of the hub portion.

DRAWINGS

FIG. 1 is a fragmentary, vertical, sectional view of an improved sealed wheel and axle assembly including a sealing washer forming one embodiment of the invention;

FIGS. 2 and 3 are enlarged, end views of the sealing washer of FIG. 1;

FIG. 4 is an enlarged, fragmentary, vertical, sectional view of the sealing washer of FIG. 1;

FIG. 5 is an enlarged, fragmentary, vertical, sectional view of the sealed wheel and axle assembly of FIG. 1; and, FIG. 6 is a fragmentary, vertical, sectional view of a wheel and axle assembly forming an alternate embodiment of the invention.

A golf cart 10 having a wheel and axle assembly 12 form a specific embodiment of the invention. The assembly 12 includes a wheel 14 journaled on "Nyliner" bearings 16 and 17 on an axle 18 carrying one side of a frame or leg 20 of the golf cart. An "E" retainer ring 22 in an annular groove 24 in the outer end portion of the axle forms, with a metal washer 26, an outer retainer for the wheel to take up thrust and limit travel of a hub 28 of the wheel to the left, as viewed in FIG. 1. A hub cap 30 and sealing ring 31 seal to the wheel and cover and seal the outer ends of the axle and wheel from dirt, a screw 32 holding the hub cap in sealing position. The inner end of the hub and the axle are sealed from dirt and end play of the hub is taken up by a sealing washer 34 between a metal washer 35 engaging one of the bearings 17 and an end face 36 of a boss portion 38 of the frame. The sealing washer forms one specific embodiment of the invention.

The sealing washer 34 is a combined thrust member or spring and a seal. It is molded and preferably is composed of a tough elastomeric material such as, for example, polyurethane or buna-M-rubber of about 70 duro, shore "A". The washer 34 includes an inner, flatly cupped or frustoconical, thick thrust washer portion 40 fitted with an interference fit on the axle 18 and engaging a washer 41. An outer, thinner, sealing flange 42 which is somewhat more deeply cupped or frustoconical, is joined to the washer portion by a generally cylindrical offsetting portion 44 and an arcuate, even thinner, hinge portion 46. The outer edge of the sealing lip portion flange has a sharp corner 48, although other corners 50, 51, 52, 53 and 54 of the washer are preferably rounded. The angle between the flange and a plane normal to the axle may be about 25° and the angle between the washer portion and that plane may be about 17° 30'.

EMBODIMENT OF FIG. 6

A wheel and axle assembly 110 forming an alternate embodiment of the invention is like the assembly 10 but has a hub cap 130 which is not sealing and, to seal the outer end of hub 128 and axle 118, a sealing washer 135 is provided between a retainer ring 122 and a washer 123 and the hub. The washer 135 is like the washer 34 as is a sealing washer 134 at the inner side of the wheel. Also, a metal washer 136 is positioned between "Nyliner" bearing 116 and thrust washer portion 139 of the washer 135. The thrust washer portion 139 has an interference fit on the axle 118 so it does not turn on the axle, and a sealing flange 143 sealingly engages end face 145 of the hub 128.

What is claimed is:

1. In a sealing washer,
   an inner thrust washer portion,
   an outer sealing flange portion,
   a flexible hinging portion intermediate the outer periphery of the thrust washer portion and the inner periphery of the sealing flange portion, and
   a longitudinally offsetting generally cylindrical portion joining the flange portion to the hinging portion.

2. The sealing washer of claim 1 wherein the sealing flange portion is substantially frustoconical.

3. The sealing washer of claim 1 wherein the thrust washer portion is substantially frustoconical.

4. In a sealing washer,
   an inner thrust washer portion of a predetermined thickness and being substantially frustoconical in shape,
   a cupped, annular hinge portion having an inner edge portion joined to the outer edge portion of the thrust washer portion and being substantially thinner than the thrust washer portion,
   a tubular, longitudinally offsetting portion joined to the outer edge portion of the hinge portion,
   and an annular sealing flange portion joined at its inner edge portion to the tubular offsetting portion and being substantially frustoconical in shape and also being substantially thinner than the thrust washer portion.

5. In combination,
   an axle having an outer end and an inner end,
   a hub member rotatable on the axle,
   thrust limiting means on the inner end of the axle, a seal including an inner, cupped washer-like portion fitting tightly on the axle and engaging the thrust limiting means and also having an outer, cupped sealing flange engaging the hub member and a resilient hinge portion connecting the washer-like portion and the sealing flange, and second thrust means secured to the outer end portion of the axle and pressing the hub member against the flange.

6. The combination of claim 5 including thrust bearing means engaging the hub member and the washer-like portion.

7. The combination of claim 6 wherein the thrust bearing means includes a flanged bearing and a thrust washer engaging the flanged bearing and the washer-like portion.

8. The combination of claim 5, wherein the seal includes a sleeve-like portion connecting the hinge portion to the flange to offset the flange from the washer-like portion.

9. The combination of claim 5 including outer sealing means sealing the outer end portion of the axle and the outer side of the hub member.

10. The combination of claim 9 wherein the outer sealing means includes a second seal like the first-mentioned seal.

11. The combination of claim 10 wherein the outer sealing means comprises a hub cap.

* * * * *